United States Patent
Dufresne et al.

(10) Patent No.: US 9,227,159 B2
(45) Date of Patent: Jan. 5, 2016

(54) COMBINED MICROFILTRATION OR ULTRAFILTRATION AND REVERSE OSMOSIS PROCESSES

(75) Inventors: Kevin Simon Joseph Dufresne, Oakville (CA); Denis Joel Marie Guibert, Oakville (CA)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 803 days.

(21) Appl. No.: 13/296,884

(22) Filed: Nov. 15, 2011

(65) Prior Publication Data

US 2013/0118978 A1    May 16, 2013

(51) Int. Cl.
| | |
|---|---|
| B01D 61/00 | (2006.01) |
| B01D 63/00 | (2006.01) |
| C02F 1/44 | (2006.01) |
| B01D 21/24 | (2006.01) |
| B01D 24/38 | (2006.01) |
| B01D 21/30 | (2006.01) |
| B01D 61/58 | (2006.01) |
| B01D 61/12 | (2006.01) |

(Continued)

(52) U.S. Cl.
CPC ............... B01D 61/58 (2013.01); B01D 61/12 (2013.01); C02F 1/441 (2013.01); C02F 1/444 (2013.01); *B01D 61/025* (2013.01); *B01D 61/14* (2013.01); *B01D 2315/06* (2013.01); *B01D 2317/025* (2013.01); *B01D 2317/04* (2013.01); *C02F 2209/005* (2013.01); *C02F 2209/40* (2013.01); *C02F 2209/42* (2013.01)

(58) Field of Classification Search
CPC .... B01D 61/04; B01D 61/025; B01D 17/085; B01D 61/147; B01D 2315/06; B01D 2317/04; C02F 1/441

USPC ........ 210/650, 652.641, 257.2, 85, 90, 195.2, 210/416.2, 137, 636, 258
See application file for complete search history.

(56) References Cited

U.S. PATENT DOCUMENTS

| | | | |
|---|---|---|---|
| 4,000,065 A | 12/1976 | Ladha et al. | |
| 4,574,049 A | * 3/1986 | Pittner | .......................... 210/639 |
| 5,380,755 A | * 1/1995 | Arvanitis et al. | .............. 514/522 |

(Continued)

FOREIGN PATENT DOCUMENTS

| | | |
|---|---|---|
| EP | 1210298 B1 | 4/2003 |
| JP | 2000-288575 | * 10/2000 |

OTHER PUBLICATIONS

Gagliardo et al., "Application of reverse osmosis membranes for water reclamation with various pretreatment processes"; Proceedings of the Water environment Federation, WEFTEC, 2000, Session 11 through session 20; Abstract.

(Continued)

*Primary Examiner* — Ana Fortuna
(74) *Attorney, Agent, or Firm* — Scott Pundsack; Borden Ladner Gervais LLP

(57) ABSTRACT

A water treatment system combines a microfiltration or ultrafiltration membrane system with a downstream reverse osmosis membrane system. The MF or UF system has multiple trains of immersed membrane modules. The trains are connected to a common permeate pump. The permeate pump discharges directly into the inlet of an RO feed pump. The membrane trains are each subjected to the same suction. The permeate pumps are operated to provide the required flow to the RO feed pump at or above the minimum inlet pressure of the RO feed pump.

10 Claims, 1 Drawing Sheet

(51) Int. Cl.
*B01D 61/14* (2006.01)
*B01D 61/02* (2006.01)

(56) References Cited

U.S. PATENT DOCUMENTS

| | | | |
|---|---|---|---|
| 6,068,764 A | 5/2000 | Chau | |
| 6,110,375 A * | 8/2000 | Bacchus et al. | 210/652 |
| 6,120,688 A * | 9/2000 | Daly et al. | 210/650 |
| 6,190,553 B1 * | 2/2001 | Lee | 210/602 |
| 6,451,201 B1 * | 9/2002 | Cadera et al. | 210/85 |
| 6,899,812 B2 * | 5/2005 | Cote et al. | 210/636 |
| 6,949,192 B2 | 9/2005 | Gsell | |
| 7,368,058 B2 | 5/2008 | Nishikawa et al. | |
| 7,632,410 B2 | 12/2009 | Heiss | |
| 7,879,229 B2 | 2/2011 | Phagoo et al. | |
| 8,083,948 B2 * | 12/2011 | Ito et al. | 210/652 |
| 8,758,621 B2 * | 6/2014 | Zuback | 210/636 |
| 8,758,622 B2 * | 6/2014 | Muller | 210/636 |
| 2005/0006295 A1 * | 1/2005 | Bharwada | 210/321.6 |
| 2005/0224412 A1 | 10/2005 | Best et al. | |
| 2008/0053900 A1 * | 3/2008 | Shafer et al. | 210/631 |
| 2008/0060999 A1 * | 3/2008 | Musale et al. | 210/636 |
| 2008/0203019 A1 * | 8/2008 | Adams et al. | 210/636 |
| 2008/0290032 A1 | 11/2008 | Ton That | |
| 2009/0173690 A1 * | 7/2009 | Oklejas, Jr. | 210/637 |
| 2011/0100914 A1 | 5/2011 | Mairal et al. | |
| 2011/0147310 A1 * | 6/2011 | Ito et al. | 210/652 |
| 2011/0198237 A1 | 8/2011 | Powell | |
| 2011/0198290 A1 * | 8/2011 | Oklejas, Jr. | 210/652 |
| 2012/0234760 A1 * | 9/2012 | Ito et al. | 210/652 |
| 2013/0118978 A1 * | 5/2013 | Dufresne et al. | 210/641 |
| 2013/0140233 A1 * | 6/2013 | Taniguchi et al. | 210/637 |
| 2013/0206697 A1 * | 8/2013 | Takata et al. | 210/652 |
| 2013/0220924 A1 * | 8/2013 | Maeda, Tomohiro | 210/636 |
| 2014/0311981 A1 * | 10/2014 | Christie et al. | 210/652 |

OTHER PUBLICATIONS

Lozier, James C., "Desalination Technology Overview", presented at the Water Resources Research Center Conference; Yuma, Arizona, USA; Apr. 2011.

Ling, Wang et al., "Performance of composite reverse osmosis membranes used in textile wastewater treatment and reutilization", International Conference on Computer Distributed Control and Intelligent Environmental Monitoring; Feb. 19-20, 2011; pp. 1611-1614.

Lin, Zhiwen et al., "A pilot study of ultrafiltration pretreatment for seawater reverse osmosis desalination in Bohai Bay"; Second International Conference on Mechanic Automation and Control Engineering (MACE); Jul. 15-17, 2011; Abstract.

Wilf, Mark et al., "Integrated Membrane Desalination Systems—Current Status and Projected Development"; from http://www.membranes.com/docs/papers/New%20Folder/Abstract%20for%20Tianjin%20-%20Hydranautics.pdf; Date unknown.

Kruger, Ralf. "Ultrafiltration Pretreatment in Large Seawater Desalination Plant in the Arabic Gulf"; from http://www.waterworld.com/index/display/article-display/5339487148/articles/membranes/volume-3/issue-1/features/ultrafiltration-pretreatment.html; Date unknown.

Search Report and Written Opinion from corresponding PCT Application No. PCT/US2012/060175 dated Mar. 18, 2013.

* cited by examiner

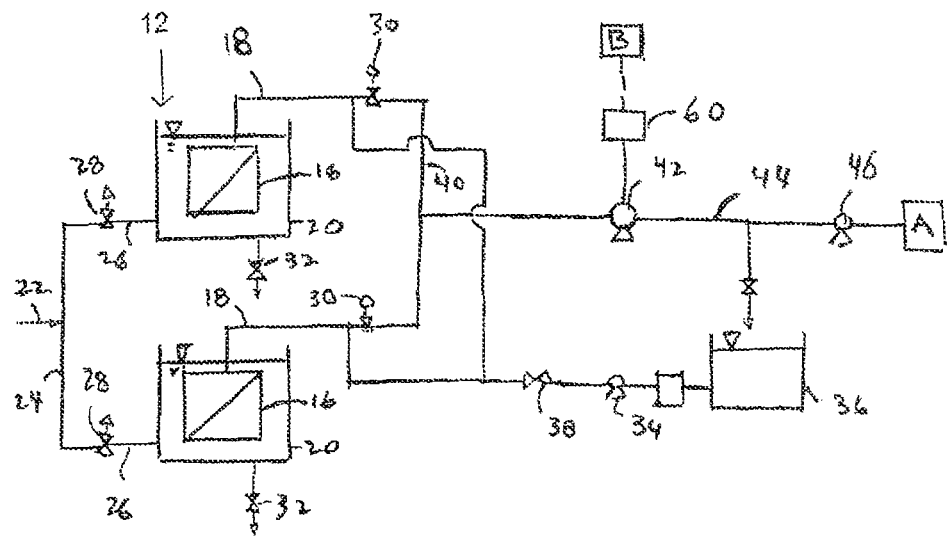
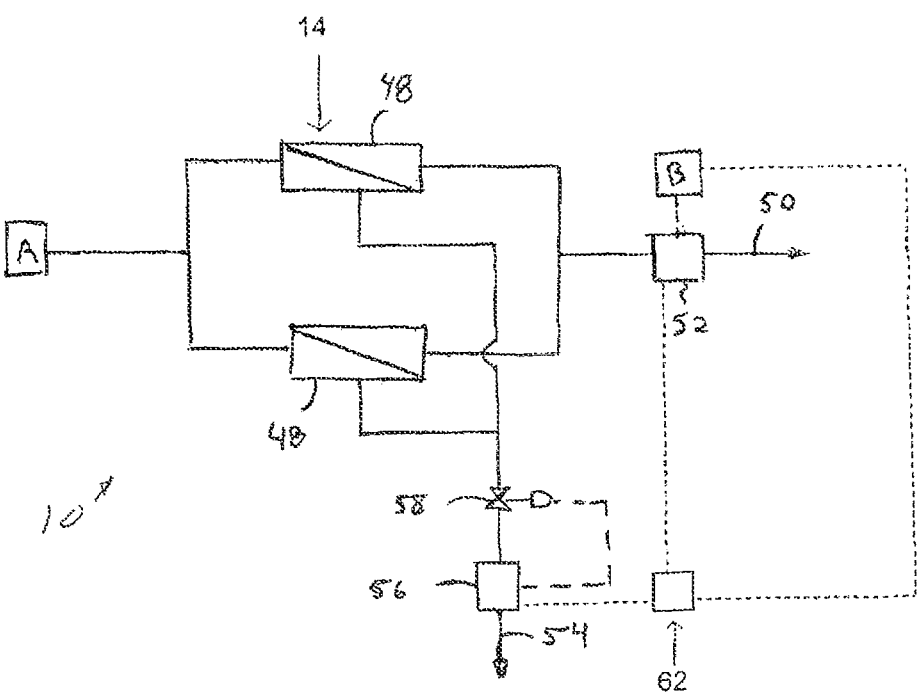

COMBINED MICROFILTRATION OR ULTRAFILTRATION AND REVERSE OSMOSIS PROCESSES

FIELD

The invention is in the field of membrane processes for water treatment such as microfiltration, ultrafiltration and reverse osmosis.

BACKGROUND

The following discussion is not an admission that anything discussed below is common general knowledge or citable as prior art.

Some water treatment processes use multiple membrane treatment steps in series. In particular, microfiltration (MF) or ultrafiltration (UF) membranes may be used to pre-treat water prior to a nanofiltration (NF) or reverse osmosis (RO) step. Such combined processes are used for example in sea water desalination, wastewater recovery and in some industrial water treatment plants.

For example, a presentation entitled "Desalination Technology Overview" presented by James C. Lozier at the April 2011 Water Resources Research Center Conference in Yuma, Ariz., USA, describes a seawater RO plant. In this plant, there are three trains of UF or MF immersed membranes each having a suction pump delivering permeate to a break tank. From the break tank, water is pumped through a set of parallel RO trains. The RO permeate is stored in tanks and then transferred to a distribution system.

INTRODUCTION

The following section is intended to introduce the reader to the detailed description to follow and not to limit or define any claims. One or more inventions may be comprised of a combination or sub-combination of elements or steps described in this introduction or in other parts of this specification.

A water treatment system combines a microfiltration or ultrafiltration membrane system with a downstream reverse osmosis membrane system. The UF or MF membrane system has multiple trains of immersed MF or UF membrane modules. The trains are connected to a common set of one or more permeate pumps. The permeate pumps discharge directly into the inlet of an RO feed pump. In a water treatment process, the membrane trains are each subjected to the same suction. The permeate pumps are operated to provide the required flow to the RO feed pump at or above the minimum inlet pressure of the feed pumps.

BRIEF DESCRIPTION OF THE DRAWINGS

FIG. 1 is a schematic process flow diagram of a water treatment system.

DETAILED DESCRIPTION

FIG. 1 shows a water treatment system 10. The water treatment system 10 combines a UF or MF system 12 with an RO system 14, which may be replaced by a nanofiltration system or a combined nanofiltration and RO system for some applications. The water treatment system 10 may be used, for example, for sea water desalination, for wastewater recovery and reuse, or for various industrial water treatment applications.

The UF or MF system 12 has many membrane modules that are hydraulically connected to form a train 16. In particular, all of the membrane modules in a train 16 discharge permeate, alternatively called filtrate, into a common filtrate header 18. The modules in a train 16 may also be physically connected, or they may be separated into smaller physical groups such as cassettes. The membrane modules may be, for example, ZeeWeed™ modules sold by GE Water and Process Technologies.

Each train 16 is located in a separate tank 20. The tanks 20 may be distinct structures or regions separated by partitions in a larger tank. Optionally, two or more trains 16 may be located in a common tank 20 but in that case the two or more trains 16 are treated as one larger train 16 unless they can be separately monitored and individually shut down. Although two trains 16 are shown in FIG. 1, more trains 16 may be provided. A larger number of trains 16 reduces the effect of one train 16 being temporarily out of service, for example for a deconcentration or cleaning procedure. Further, in the water treatment system 10 there are no pumps dedicated to a individual train 16 and only two valves, and very little if any instrumentation, dedicated to an individual train 16. Accordingly, the incremental cost of subdividing the total number of membrane modules into a greater number of trains 16 is not large. For example, five or more trains 16 may be used.

Feed water is provided to the tanks 20 from a feed inlet 22 connected to a feed distribution manifold 24. The feed distribution manifold 24 is in turn connected to a tank inlet 26 associated with each tank 20. The tank inlet 26 is located near the bottom of a tank 20 or at least in part below ordinary water levels in the tank 20. In this way, the division of the total feed flow between the tanks 20 is affected by the relative water level in the tanks 20. If one train 16 fouls and begins to produces less permeate, the water level in that tank 20 will rise. The rising water level will both reduce the rate of feed flow into thank tank 20 and increase the transmembrane pressure (TMP) across that train 16 until a new equilibrium is reached. Since the train 16 has fouled, its flux will be lower at the new equilibrium but the increase in TMP will moderate the decrease in flux. Conversely, if a first train 16 is more permeable than a second train 16, the water level in the first tank 20 will be lower than in the second tank 20. The TMP of the first train 16 will be lower than the TMP of the second train 16. Although the first train 16 will still have a higher flux, its reduced TMP will reduce the difference in flux between the first and second trains. At an equilibrium condition, more feed water will flow to the first tank 20. The head loss to the first tank 20 minus the head loss to flow to the second tank 20 will be equal to the difference in water level equal. In this way, feed water is automatically divided between the tanks 20 as required to accommodate different fluxes in each tank 20, and TMP is automatically adjusted in a way that tends to dampen differences in permeability between the trains 16.

Each tank inlet 26 has a feed valve 28. The feed valve 28 is fully open while the associated train 16 is operating in a permeation phase of its cycle. However, the feed valve 28 is closed when the train 16 enters a deconcentration or cleaning cycle, or during an optional flux test to be described further below. In a deconcentration cycle or cleaning cycle, the feed valve 28 is closed to isolate the associated tank 20 from the feed inlet 22. A permeate flow control valve (FCV) 30 in the filtrate header 18 is also closed. Optionally, the train 16 may continue to produce permeate for a period of time after the feed valve 28 is closed to reduce the volume of water in the tank 20. Optionally, a backwash pump 34 may be operated to flow permeate from a backwash tank 36, with or without cleaning chemicals, through an opened backwash valve 38, and to the train 16. Other optional cleaning processes involve filling the tank 20 with a cleaning solution and soaking the membranes or permeating cleaning solution through the membranes. At some point in a cleaning or deconcentration cycle, a drain valve 32 may be opened to drain the tank 20 of accumulated solids or cleaning solutions. To refill the tank, the feed valve 28 is opened after the drain valve 32 is closed. During the refilling, the feed valve 28 may be opened to a predetermined partially open position to avoid filling the tank 20 too rapidly, which may damage the membranes. Once the tank is full, and the permeate FCV 30 is open, the feed valve 28 is left fully open.

The filtrate headers 18 of the trains 16 are connected to a common plant permeate pipe 40. The plant permeate pipe 40 is in turn connected to the inlet of a permeate pump 42. The permeate pump 42 discharges to a connecting pipe 44. Although a single permeate pump 42 is shown in FIG. 1, there would typically be a set of pumps connected in parallel to the plant permeate pipe 40 and all discharging to the connecting pipe 44.

The permeate FCVs 30 are typically left fully open while a train 16 is producing permeate. The permeate FCVs 30 are not operated to produce the same flux from each train 16. However, if a train 16 is exceeding its maximum permissible flux (which may be greater than its typical design flux) then the permeate FCV 30 is partially closed to prevent over-fluxing of that train 16.

The permeate pump 42 creates a partial vacuum, which is shared across all of the trains 16. The vacuum applied to the trains 16 will be generally equal between the trains 16 but for some variation due to different flows, and head losses, in the filtrate headers 18. Since the vacuum is generally equal between trains 16, the flow drawn from each train 16 will vary according to the permeability of the membranes in each train 16, subject to dampening cause by variations in water level discussed earlier, and variations in head loss in the filtrate headers 18.

The resulting variances in permeate flow between trains 16 is tolerated as long as none of the trains 16 exceed their maximum flux. This is more energy efficient than partially closing the permeate FCVs (30) to balance the trains 16. If the flow variances result in a train 16 exceeding its maximum flux, the permeate FCV 30 can be closed by a pre-determined amount, or by an amount calculated or predicted to bring the train 16 back under its maximum flux. If a permeate FCV 30 is closed by a pre-determined amount, this adds resistance to the train 16 being over-fluxed, thus reducing its flux for the next permeate cycle. If the train 16 is still above the maximum permitted flux in the next permeate cycle, then the permeate FCV 30 is closed by another pre-determined amount.

To determine whether a train 16 is exceeding its maximum flux, a flow indicator-transmitter (FIT) can be placed in the filtrate header 18. Alternatively, the flux can be estimated by measuring the rate of water level decrease in a tank 20 when the tank inlet 26 is closed and permeate continues. This can occur at the start of a deconcentration or cleaning sequence, or in a separate flux test. Alternatively, since the water level in the tanks 20 is related to flux through the trains 16, a low water level in a tank 20, or a large difference in water level between two or more tanks 20, indicates a high flux in the train 16 in the tank 20 with a low water level. The water level of a tank 20, or the difference in water level between a tank 20 and the average water level or another tank 20, can be correlated to flux and used to indicate whether a train 16 is exceeding its maximum flux. In another alternative, flow in a train 16 is estimated by measuring the pressure in its associated tank inlet 26 or in all tank inlets 26. The difference in pressure in a tank inlet 26 relative to the static head in the tank 20 can be correlated to the flow velocity, and flow rate, into the tank inlet 26. Similarly, pressure in the tank inlet 26 less static head in the tank 20 can be compared between tanks 20 to determine if one train 16 is above its maximum permissible flux.

The permeate pump 42 discharges directly into the inlet of an RO feed pump 46. Although only one RO feed pump 46 is shown, a set of RO feed pumps 46 connected in parallel is likely to be used. The permeate pump 42 acts as a booster pump delivering water to the RO feed pump 46 at a pressure at or above the specified minimum inlet pressure of the RO feed pump 46, or at least sufficient to prevent cavitation in the RO feed pump 46. For example, the permeate pump 42 may discharge water at a pressure of 125 kPa or more.

The RO feed pump 46 in turn delivers water at high pressure to a set of one or more RO units 48. Each RO unit 48 may be, for example, a set of spiral would membrane elements arranged end to end in a pressure vessel. Optionally, the RO units 48 may be replaced with nanofiltration units or a combination of RO and nanofiltration units.

Permeate from the RO units 48 is collected in appropriate pipes and exits through a product water outlet 50. On its way to the product water outlet 50, the RO permeate passes through a permeate FIT 52, typically a magnetic flowmeter, that measures the flow of RO permeate. The permeate FIT 52 is connected to a variable frequency drive (VFD) 60 that controls the speed of rotation of permeate pump 42. Brine from the RO units 48, also called rententate or reject water, is collected in appropriate pipes and exits through a brine FIT 56. The brine FIT 56 is connected to a brine valve 58. For both of the FITs 52, 56, their connection as shown in FIG. 1 and discussed above is intended to indicate the primary part of the system 10 controlled by each FIT 52, 56. The FITs 52, 56 are also connected to appropriate controllers, for example a programmable logic controller (PLC) or computer, electrical circuitry and servos as required to operate the VFD 60 and brine valve 58. A controller 62 may receive signals from both FITSs 52, 56 and, optionally, other sensors in the system 10 and coordinates the control of multiple components in the system 10.

In one example of a control scheme, a desired product water (RO permeate) flow rate and recovery rate are selected. A reject flow rate is calculated that will provide the selected recovery rate at the RO permeate flow rate. In a feedback control loop, the brine valve 58 is modulated based on signals from the brine FIT 56 as required to maintain the calculated flow through the brine outlet 54. In another feedback control loop, the VFD 60 modulates the speed of permeate pump 42 as required to produce the desired RO permeate flow, as sensed by RO permeate FIT 52. RO feed pump 46 generally runs at a constant velocity over extended periods of time, for example a day or more. However, RO feed pump 46 may be driven by a VFD and operate at various speeds. For example, the controller may be able to direct the RO feed pump 46 to operate at one of a set of available speeds. If the permeate pump 42 is unable to deliver the required flow, then the RO feed pump 46 may be instructed to operate at a higher speed. Conversely, if pressure at the inlet to the RO feed pump 46 falls below a minimum allowed pressure, the RO feed pump 46 may be instructed to operate at a lower speed. Dynamic adjustments to the RO permeate flow rate, for example over periods of time of one hour or less, are made by adjusting the speed of the permeate pump 42. The permeate pump 42 preferably outputs water at a generally constant flow rate, although possibly with variations of up to 5% above or below a preselected flow rate.

Variations in the speed of the permeate pump 42 cause corresponding variations in the TMP applied to the UF trains 16. As discussed above, permeate FCVs 30 are provided in the filtrate headers 18. However, the permeate FCVs are not used to balance flows between trains or to ensure that any particular flow rate is produced from each train 16. Instead, the permeate FCVs 30 remain fully open as long as a train 16 does not exceed its maximum flux. While a train 16 is isolated for a deconcentration or cleaning procedures, the TMP and flux of the remaining trains 16 increases. The total membrane surface area of the trains 16 is designed to allow at least one train 16 to be isolated without exceeding the maximum flux of all of the remaining trains 16 and to accommodate at least some irreversible fouling over the service life of the membranes. A train 16 typically exceeds its maximum flux only while another train 16 is isolated. The maximum flux may be larger than the typical design maximum flux of the same membranes, where the typical design maximum flux assumes continuous operation at that flux. However, if a train 16 chronically exceeds its maximum flux, that may indicate that one or more other trains 16 with lower flux may require replacement of some or all of its membrane modules or an intense recovery cleaning.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art.

We claim:

1. A water treatment system comprising,
   a microfiltration or ultrafiltration membrane system comprising multiple trains of immersed membranes;
   a reverse osmosis membrane system;
   one set of one or more permeate pumps connected to all of the trains;
   a set of one or more feed pumps for the reverse osmosis system,
   wherein an outlet from the set of one or more permeate pumps is connected by a closed passage to an inlet of the set of one or more feed pumps,
   a flowmeter configured to read a rate of flow of permeate from the reverse osmosis system;
   one or more variable speed drive units connected to the set of one or more permeate pumps; and
   a controller adapted to receive signals from the flow meter and adjust the speed of the variable speed drive units in correspondence with the received signals to modulate the speed of the permeate pump to produce a desired rate of flow of permeate from the reverse osmosis system.

2. The water treatment system of claim 1 comprising a feed water manifold connected to a feed water inlet of each of a plurality of tanks housing the trains, wherein the feed water inlets are below the water level in the tanks.

3. The water treatment system of claim 1 having 5 or more trains.

4. A water treatment process comprising the steps of,
   providing a flow of feed water to multiple trains of immersed microfiltration or ultrafiltration membranes;
   applying a suction pressure generated at the inlet of one or more permeate pumps to a header connected to all of the trains, to withdraw a permeate from the trains;
   flowing the permeate under pressure from an outlet of the one or more permeate pumps to an inlet of one or more feed pumps of a reverse osmosis membrane system; and
   varying the speed of the one or more permeate pumps as required to produce a desired flow rate of the permeate from the reverse osmosis membrane system.

5. The process of claim 4 wherein the desired flow rate of the permeate from the reverse osmosis membrane system is a generally constant flow rate.

6. The process of claim 4 wherein the pressure is 125 kPa or more.

7. The process of claim 4 further comprising steps of determining whether the flux of a train is exceeding a predetermined maximum flux and, if so, partially closing a flow control valve between the train and the one or more permeate pumps.

8. The process of claim 7 wherein determining the flux of a train comprises shutting an inlet to a tank containing the train, measuring the rate of reduction in water level in the tank, and calculating the flux of the train based on the measured rate or reduction.

9. The process of claim 7 wherein determining the flux of a train comprises measuring the water level in a tank containing the train and calculating or determining the flux of the train based on the measured water level.

10. The process of claim 7 wherein determining the flux of a train comprises determining a difference between the static pressure in an inlet to a tank containing the train and a water level in that tank and calculating or determining the flux of the train based on the difference.

* * * * *